March 1, 1955     J. H. BREMS     2,703,007
SURFACE SMOOTHNESS GAUGE
Filed March 15, 1952
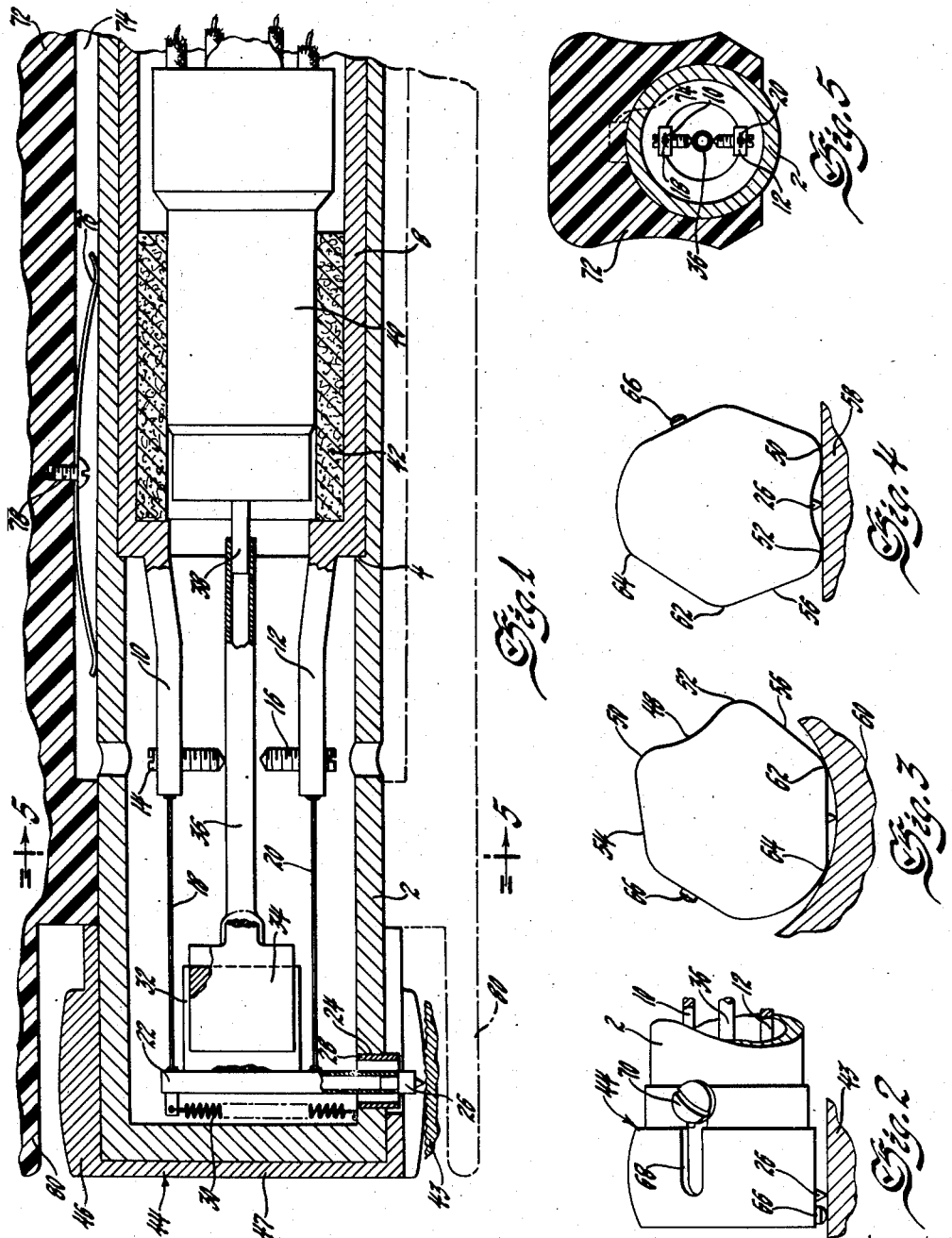
Inventor
*John H. Brems*
By *Willits, Helmig & Baillio*
Attorneys

United States Patent Office 2,703,007
Patented Mar. 1, 1955

2,703,007
SURFACE SMOOTHNESS GAUGE

John H. Brems, Detroit, Mich., assignor to General Motors Corporation, Detroit, Mich., a corporation of Delaware Application March 15, 1952, Serial No. 276,770

11 Claims. (Cl. 73—105)

This invention relates to measuring or gaging means and more particularly to means for measuring or gaging the irregularities in a machined or ground surface. A device of this type is disclosed in co-pending application Serial No. 246,853, filed September 15, 1951, entitled "Surface Smoothness Measuring Means," in the names of John H. Brems and Joseph B. Bidwell, and the present invention is an improvement over the construction disclosed in that application. The tracer or pick-up head, as disclosed in the earlier filed application, is adapted to be drawn across the surface to be measured and this movement produces signals indicative of the smoothness of the surface being gaged. This movement may be accomplished by a mechanically driven arm to which the tracer is clamped or it may be accomplished by holding the tracer in the hand and manually moving it across the surface. As this movement takes place, a stylus in the pick-up head follows the minute contour of the surface moving with respect to the casing or housing, and this movement is utilized to actuate indicating and measuring means. The pick-up head must be maintained in constant given relationship in general to the surface being gaged.

It is therefore one of my objects in making the invention to provide a reference surface or guide for the pick-up head which will ride on the surface to be measured.

It is a further object in making the invention to provide means having a plurality of selectable reference surfaces for the pick-up unit to be used with differing contours of surfaces to be measured.

It is a still further object in making the invention to provide an adjustable index shoe or rider means for the pick-up unit that adapt it for use on different surface contours.

It is a still further object in making the invention to provide an adjustable protective case for the pick-up which can be moved to cover the stylus when the instrument is not in use.

With these and other objects in view which will become apparent as the specification proceeds, my invention will be best understood by reference to the following specification and claims and the illustrations in the accompanying drawings, in which:

Figure 1 is an enlarged vertical section through a pick-up unit embodying my invention.

Figure 2 is a reduced scale, side view of the end of the pick-up head in which the stylus is mounted with the adjustable turret rider attached.

Figures 3 and 4 are schematic end views of the adjustable turret rider and stylus illustrating the application of the different peripheral portions of the turret to different surface contours; and Figure 5 is a reduced sectional view taken on the line 5—5 of Figure 1.

Referring now more particularly to the drawings, in Figure 1 there is shown a housing 2 of cylindrical form having a shoulder 4 formed by a change in internal diameter approximately midway of the length of the housing. A frame member has a cylindrical section 8 adapted to fit snugly within the larger diameter of the housing and which abuts the shoulder 4 when assembled therein. Two supporting arms 10 and 12 integral with the section 8 extend forwardly therefrom and in turn support two aligned adjustable limit screws 14 and 16 which project toward each other. In substantial alignment with and extending from the outer ends of the arms 10 and 12, to which they are secured in any desired manner such as by welding, are a pair of parallel flat resilient strips 18 and 20 respectively. Cylindrical stylus holder 22 is secured to the outer ends of the strips 18 and 20 and extends transversely of the housing 2 and through an opening 24 in one side thereof. A stylus 26 is mounted in the end of the stylus holder 22 which projects through said opening.

A bushing 28 is pressed into the opening 24 to restrict the free movement of the end of the stylus holder so that in case some object is forced against the stylus 26, it will physically engage the bushing 28 and prevent any distortion by buckling of the resilient supporting arms 18 and 20. A biasing spring 30 is connected to the inside of the housing 2 adjacent the opening 24 and to the upper end of the stylus holder 22, as seen in Figure 1, and tends to eject the stylus outwardly. A plate 32 is secured to one side of the stylus holder 22 by any suitable means such as soldering or welding and extends axially to the right, as shown in Figure 1, between two spaced plates 34 which are mounted on the end of a force transmitting shaft or rod 36. The space between the two parallel sheets 34 is just sufficient to provide for the interleaved plate 32 and a very thin layer of oil on each side. This coupling acts as a mechanical force transmitting means between the stylus holder 22 and the shaft 36. It also acts as a low frequency filter inasmuch as slow movement of the stylus with respect to the shaft 36 will cause relative movement of the plates 32 and 34, whereas rapid or high frequency oscillations of the stylus will be transmitted from one to the other.

The shaft 36 is hollow and slides over an operating rod or pin 38 on the end of an electronic tube 40 mounted on insulating material 42 which lines the frame member 8. The operating rod 38 is connected through a flexible coupling means in the end of the electronic tube to one of the tube elements and, therefore, any movement of this rod will provide relative movement of the tube elements and affect the conductivity through the tube, which provides the signal. The construction so far described is more completely described in Serial No. 246,853, above mentioned, and forms no part of the present invention.

As stated above, the operator either mounts this tracer or pick-up unit on a mechanical arm and causes it to be moved across a surface such as 43 to be gaged, or grasps the unit in his hand and draws it across the surface. Any irregularity in the surface will cause the stylus 26 to move vertically, which movement is transmitted through the coupling means 32, 34 to the movable electrode connected to rod 38. However, it is necessary to have some reference surface or level from which the stylus can move in either direction and also which will assist in preventing the pick-up unit from being twisted or turned, which would give an erroneous relative movement of the stylus and an erroneous signal when actually there was no surface variation to cause the same.

Since it may be desirable to utilize the pick-up or tracer on surfaces having various types of configuration and contour there has been provided an adjustable turret or reference guide having a plurality of different spacings which can be mounted on the end of the housing 2 and set in a number of different positions so that the device may be satisfactorily used with varying general contours. This turret consists in the main of a cap-shaped member indicated generally at 44, which has a short quasi cylindrical section 46 and a disc cover section 47. The periphery of the portion 46 is formed of a number of different surfaces, some being flat or tangential with respect to the radius of the cap, others being concave, and some convex with respect to tangential lines.

The reason for these various contours is to provide differing slides or riding skids for the stylus. For example, if the surface to be gaged is flat and the pick-up is to be held firmly against the flat surface and drawn thereover, spaced sliding surfaces or skids can be provided at some distance from the stylus on either side and the device will operate satisfactorily. However, if the gage is to be used on a surface having a comparatively high degree of curvature, then the skid or slide portions must be closer together or the stylus will not be able to reach the surface midway between the two skid points. Lastly, if the device is to be mounted on a machine arm which will hold it rigidly against tilting or rotating about its major axis, then one skid will be sufficient which extends the proper distance out from the casing with respect to the stylus point.

Therefore, the peripheral surface of the member 44 has been designed as best shown in Figure 3. In that view, which is a diagrammatic end view looking from the left of Figure 1, there is shown a slightly concave surface 48 between two points 50 and 52. Points 50 and 52 will thus contact the surface to be gaged and the concave center will provide a location and clearance for the stylus. Sections 54 and 56 are merely straight sections interconnecting other operative or useful parts of the turret head. The concave portion 48 is that which is used for gaging flat surfaces such as shown in Figure 4 at 58 or surfaces in which the degree of curvature is comparatively slight. As shown in Figure 4, points 52 and 50 are in contact with the surface to be gaged and the stylus 26 projects downwardly at the approximate center of the curvature 48.

When the curvature of the surface to be gaged becomes quite marked, as shown in the surface 60 of Figure 3, then that portion of the turret between contact points 62 and 64 will be utilized. Since the part to be gaged has considerable curvature, it will not be necessary to provide the turret head with a concave portion, for the stylus in projecting below this straight surface between contact points 62 and 64 will have ample clearance room for gaging. If it is desired to mechanically secure the tracer or pick-up head to a mechanical arm and have it move the device over a surface, then the turret head can be rotated so that the spacing button 66 is in proximity to the stylus as shown in Figure 2, and this gives a reference for the housing or casing as the arm is drawn over the surface.

The cap 44 is provided with a series of axially extending slots 68, being three in number, and spaced at 120° from each other around the periphery thereof. Likewise securing screws 70 are threaded into the housing 2 at 120° arcuate spacing, from the stylus locale on each side. When the two screws 70 are loosened, the cap may be removed and turned so that any one of the three desired sections is in the lowermost position, and then the cap slid back on the end of the housing 2, the lower slot 68 providing an opening for the bushing 28 which protects the stylus and also acts as a securing surface for the cap as the cap is pressed back on. When in full engagement the screws 70 are tightened to hold the turret head in place. Thus by merely loosening the screws and pulling the turret head off and reassembling, the device can be adjusted to satisfactorily gage flat parts, parts having considerable curvature, or scanning by machine movement.

There is also provided a manual holding member 72 which is made of any suitable material such as plastic and which is adapted to be slid over the housing 2 and encompasses a large portion thereof. It is so shaped as to be easily grasped in the hand and is provided with an axially extending slot 74 in which is maintained a bowed pressure spring 76 by a short rivet 78. This spring presses against the outer surface of housing 2 when the holding member is slid on the housing. The member 72 does not continue down around the bottom of the housing as it would interfere with the movement of the same over a surface to be tested. The holding member 72 encompasses approximately two-thirds of the outer periphery of the housing 2. In its position of use the holding member 72 occupies the position, with respect to housing 2, as shown in Figure 1, and is provided with an extending lip 80 which projects out over the turret cap. When the device is being utilized for gaging this extension 80 merely acts as a convenient finger rest for the operator. However, after the gaging has been accomplished and the device stored, the holding member 72 may be rotated with respect to the housing member 2 until the extension 80 lies over the end of the stylus and in this position it protects the stylus from injury until such time as the operator again desires to use it for gaging, and he has merely to turn the holding member about the housing to uncover the stylus and make it ready for instant use. The position of the extension 80 when moved to a protective position is shown in dash and dotted lines in Figure 1.

I claim:

1. In gaging means, a housing, a stylus resiliently mounted within said housing and projecting through an opening therein, and adjustable guide reference means having an irregular outline affording different spacings for surface contact mounted on the housing adjacent the stylus so that any desired one of the different surface contact spacings may be used for reference engagement.

2. In gaging means, a housing, a stylus resiliently mounted within said housing and projecting through an opening therein, a cap fitting over the housing adjacent the stylus and having an irregular outline to provide different spacings between contact points, and means for securing said cap on the housing in a plurality of different positions to provide the stylus with guide spacings for different contour surfaces.

3. In gaging means, a housing having an opening in one side thereof, a stylus resiliently mounted in said housing and projecting through said opening, an adjustable member having an irregular surface contour providing a plurality of different engageable guide surfaces mounted on said housing adjacent the stylus so that different portions of said member may be alternately used to guide said stylus and provide a reference surface.

4. In gaging means, a cylindrical housing having an opening in one side thereof, a stylus resiliently mounted in said housing and projecting through said opening, a cap member mounted over the end of the housing and having a portion of its periphery adjacent said stylus, said periphery being of irregular configuration to provide different spacing between contactable surfaces which act as guides for the stylus and means to secure said cap in a plurality of different positions with respect to the stylus.

5. In gaging means, a cylindrical housing having an opening in one side thereof, a stylus resiliently mounted in said housing and projecting through said opening, a cap member mounted over the end of the housing and having a portion of its periphery adjacent said stylus, said periphery being of irregular configuration to provide different spacing between contactable surfaces which act as guides for the stylus, means to secure said cap in a plurality of different positions with respect to the stylus, and holding means mounted on said housing and movable relative to the same, said holding means having a protective extension capable of movement over said stylus to protect the same.

6. In gaging means, a cylindrical housing having an opening in one side thereof, a stylus resiliently mounted in said housing and projecting through said opening, a cap member mounted over the end of the housing and having a portion of its periphery adjacent said stylus, said periphery having sections of concave configuration, flat configuration and protruding contact, each of which acts as a guide for the stylus when it is in proximity thereto, and means on said housing for securing said cap in a multiplicity of positions so any one portion of the periphery may act as a guide surface.

7. In gaging means, a cylindrical housing having an opening in one side thereof, a stylus resiliently mounted in said housing and projecting through said opening, a cap member mounted over the end of the housing and having a portion of its periphery adjacent said stylus, said periphery having sections of concave configuration, flat configuration and protruding contact, each of which acts as a guide for the stylus when it is in proximity thereto, said periphery having slots therein at geometrically symmetrical positions and threaded means in the housing to engage the slots and clamp the cap on the housing at different desired positions.

8. In gaging means, a cylindrical housing having an opening in one side thereof, a stylus resiliently mounted in said housing and projecting through said opening, a cap member mounted over the end of the housing and having a portion of its periphery adjacent said stylus, said periphery having sections of concave configuration, flat configuration and protruding contact, each of which acts as a guide for the stylus when it is in proximity thereto, said periphery having slots therein at geometrically symmetrical positions and threaded means in the housing to engage the slots and clamp the cap on the housing in different desired positions, and holding means mounted on said housing and movable relative to the same, said holding means having a protective extension capable of movement over said stylus to protect the same.

9. In gaging means, a substantially cylindrical housing having an opening in one side, a stylus resiliently mounted within the housing and projecting through said opening, electrical means in said housing connected to said stylus whose characteristics change due to stylus movement, holding means mounted on said housing encompassing more than one-half but less than the whole circumference of a section of the housing and being rotatable on said housing and a protective projection on one end of the holding means that may be positioned over the stylus when the assembly is not in use.

10. In gaging means, a housing having an opening in one side, a stylus resiliently mounted within the housing and projecting through said opening, manual holding means substantially surrounding said housing but leaving a portion of the surface of the housing exposed mounted on said housing and relatively movable with respect thereto and by which the gaging means may be held, and a projection on said holding means that may be moved to a position over the end of the stylus to protect the same when not in use.

11. In gaging means, a substantially cylindrical housing having an opening in one side, a stylus resiliently mounted within the housing and projecting through said opening, manual holding means substantially surrounding said housing but leaving a portion of the surface of the housing exposed rotatably mounted on said housing, and a projection on the end of the holding means that may be positioned over the end of the stylus upon rotation of the holding means on the housing when the stylus is not in use.

References Cited in the file of this patent

UNITED STATES PATENTS

| | | |
|---|---|---|
| 1,439,321 | Page | Dec. 19, 1922 |
| 2,460,726 | Arndt, Jr. | Feb. 1, 1949 |
| 2,471,737 | Fox | May 31, 1949 |
| 2,536,632 | Ernst | Jan. 2, 1951 |

FOREIGN PATENTS

| | | |
|---|---|---|
| 630,848 | Great Britain | Oct. 24, 1949 |